United States Patent [19]

Schoenebeck

[11] 3,978,188

[45] Aug. 31, 1976

[54] METHOD OF ATTACHING TENSION RODS TO CABLES AND TENSION ROD CABLE ASSEMBLIES MADE THEREBY

[75] Inventor: Karl-Heinz Schoenebeck, Stadthagen, Germany

[73] Assignee: Kabel-und Metallwerke Gutehoffnungshutte Aktiengesellschaft, Germany

[22] Filed: Aug. 22, 1975

[21] Appl. No.: 606,862

[30] Foreign Application Priority Data
Sept. 17, 1974 Germany............................ 2444324
Mar. 7, 1975 Germany............................ 2509980

[52] U.S. Cl............................. 264/139; 174/DIG. 8; 264/229; 264/230; 264/268; 403/269
[51] Int. Cl.²............................................ B29D 3/02
[58] Field of Search ........... 264/139, 229, 230, 268; 403/267, 268, 269; 174/DIG. 8

[56] References Cited
UNITED STATES PATENTS

| | | | |
|---|---|---|---|
| 3,297,819 | 1/1967 | Wetmore ....................... | 264/230 X |
| 3,355,202 | 11/1967 | Shannon ......................... | 403/269 X |
| 3,377,414 | 4/1968 | Weyer............................. | 264/135 |
| 3,448,182 | 6/1969 | Derbeyshire.................... | 264/230 X |
| 3,518,340 | 6/1970 | Raper ............................. | 264/268 X |
| 3,570,074 | 3/1971 | Schimmeyer ................... | 403/267 |
| 3,784,663 | 1/1974 | D'Ascoli ......................... | 264/230 X |
| 3,910,448 | 10/1975 | Evans............................. | 174/DIG. 8 |

Primary Examiner—Richard R. Kucia
Attorney, Agent, or Firm—Marn & Jangarathis

[57] ABSTRACT

In the attachment of a tension rod to an open end of a cable, one end of a tension rod is axially inserted into the core of the cable and the combination vertically positioned with the other end of the tension rod extending downward. A heat shrinkable plastic cap including a casting resin is moved up from below the tension rod until the inside bottom surface of the plastic cap comes proximate to the bottom of the tension rod, and the upper open portion of the plastic cap encompasses a section of the cable jacket. Heat is then applied to the upper portion of the plastic cap so as to shrink the upper portion to form a hermetic seal with the cable jacket, and then to the lower portion of the plastic cap so as to shrink that portion of the plastic cap toward the portion of the tension rod extending from the open end of the cable, so as to form a closed volume within the cap that decreases upon shrinkage to uniformly press the casting resin contained therein into the cable core. At the interface of the plastic cap and the engaged portion of the cable jacket there is preferably provided a pressure resistent bonding material that improves the hermetic seal and minimizes any longitudinal slippage between the cable core and the cable jacket upon the application of a pulling force to the tension rod.

8 Claims, 5 Drawing Figures

METHOD OF ATTACHING TENSION RODS TO CABLES AND TENSION ROD CABLE ASSEMBLIES MADE THEREBY

BACKGROUND OF INVENTION

The present invention relates to an improved method for the attachment of a tension rod to an open end of a cable by the employment of a heat shrinkable plastic cap that is utilized to encapsulate the cable end in which the tension rod is partially inserted, and to uniformly force a casting resin within the plastic cap about the tension rod and into the cable core.

Tension rods attached to communication cables are priorly known for achieving a convenient means for pulling such cables through cable conduits in the installation of the communications systems. A principal reqirement for performing such cable pulling is that the pulling force applied to the tension rod be transmitted to substantially the same degree to the cable core and to the cable jacket so as to avoid any differential longitudinal movement or slippage between the cable core and the cable jacket as the cable is pulled through the cable conduit. Additionally, it is advantageous that the open end of the cable be sealed pressure tight, and that the mechanism for attaching the tension rod to the end of the cable have maximum cross-sectional dimensions that approximate that of the cable itself so as to permit the cables to be pulled through the cable conduits whose cross-sectional dimensions approximate that of the cables.

Priorly known techniques for attaching tension rods to cables have included the insertion of tension rods into cable cores and the provision of metallic caps having dimensions approximating that of the cable jackets so as to permit attachment thereto. The prior art metallic caps so employed were by necessity first joined with the cable jackets to form a hermetic seal in a separate operation, and subsequently the casting resins were forced under pressure into the metallic caps through lateral offset openings or valves in the caps. These procedures led to additional expense and were characterized by non-uniform distribution of the casting resins into the cable cores doe to the resin feed from one side of the metallic cap. Further, such prior art metallic caps had to be of sizes in conformence with the various cable jacket sizes, thus a large number of different sized metallic caps had to be retained in inventory.

An object of the instant invention is to provide an improved method for attaching a tension rod to a cable end in a manner that the overall cross-sectional dimensions of the assemblage is substantially that of the cable per se. A further object is to provide a tension rod cable assemblage wherein the tension rod is so attached to the cable that a pulling force applied to the tension rod is distributed between the cable core and the cable jacket in a manner to avoid differential longitudinal movement or slippage between the cable core and cable jacket. Additionally, an object of the invention is to provide an improved method whereby substantially all of the casting resin included in the encapsulating plastic cap is pressed into the cable core as distinguished from remaining in the cap chamber, thus providing a more secure mounting of the tension rod in the cable core.

The manner of achieving the objectives of the instant invention is to partially extend one end of a tension rod into a cable core, hold the combination of cable and rod in a vertical position, and move a heat shrinkable plastic cap containing a casting resin therein up from below the tension rod until the upper end of the plastic cap engages a portion of the cable jacket. Then heating first the upper portion of the plastic cap which causes a shrinking of the upper portion of the plastic cap so as to engage the adjacent portion of the cable jacket to form a hermetic seal therebetween, and then heating the lower portion of the plastic cap to cause a shrinking of the cap chamber which results in a uniform distribution of substantially all of the casting resin into the cable core.

The method in accordance with the instant invention enables the utilization of a very simple constructural configurations, for example, the tension rod may consist of a serrated pointed section for insertion in the cable core and eye at the opposite end. At the time that the tension rod is inserted in the cable core there are no confining external forces applied to the cable by an already mounted cap attached to the cable jacket. The shrinking of the plastic cap caused by the application of heat thereto results in a cap configuration which at one end is determined by the diameter of the cable jacket, and at the other end substantially by the dimensions of the tension rod. No valve in the plastic cap is required for the insertion of the casting resin and, accordingly, no dimensional aberrations are caused thereby. The heating steps may be practiced with simple tools such as a soldering iron available at construction sights. Since the plastic cap after the completion of the heat application step fully encapsulates the cable end and the extending portion of the tension rod, corrosion protection is provided to the complete tension rod cable assemblage. At the time that a pulling force is to be applied to the tension rod, a portion of the plastic cap is removed so as to provide free access to the tension eye of the rod.

Various other objects of the invention will become clear from the following descriptions of the preferred embodiments thereof, and the novel features will be particularly pointed out in connection with the appended claims.

THE DRAWINGS

Reference will hereafter be made to the accompanying drawings wherein.

Figure 1:
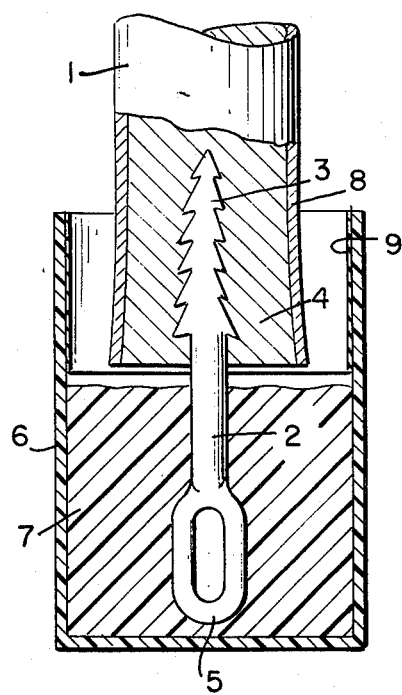
FIG. 1 is a simplified cross-sectional side elevation view of a tension rod cable assemblage, with a plastic cap in its position just prior to the application of heat for shrinking same.

FIG. 1 depicts a tension rod cable assemblage comprising an open end of an electric cable 1, a tension rod 2 having a serrated end 3 extending into the cable core 4 of cable 1, and an opposite end configured to form a tension eye 5. As illustrated in FIG. 1, the electric cable 1 and the tension rod 2 are vertically positioned with the tension eye 5 extending downward. In accordance with the instant invention, a heat shrinkable plastic cap 6 containing a casting resin 7 is moved up from below the tension eye 5 until the bottom of the plastic cap 6 comes proximate to the tension eye 5 while the top portion thereof encompasses a portion of cable jacket 8 of the cable 1. At a relatively small area of the inside upper surface of the plastic cap 6, there is provided a pressure resistent material 9.

Figure 2:
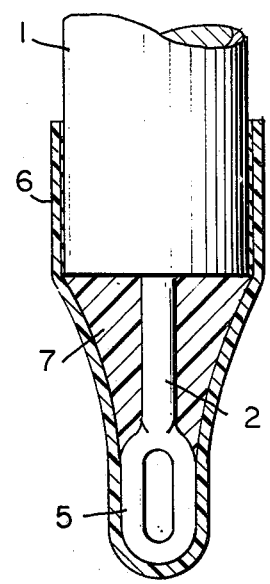
FIGS. 2 and 3 show simplified cross-sectional, side elevation views of the tension rod cable assemblage of FIG. 1, but after the plastic cap has been completely shrunk by the application of heat.
Figure 3:
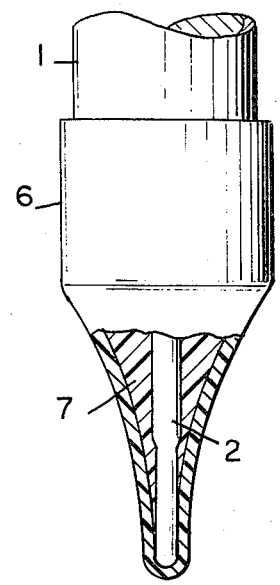

Upon the positioning of the plastic cap 6 as illustrated in FIG. 1, heat is applied in accordance with the instant invention first to the upper end of the plastic cap 6 so that the upper sides of the plastic cap shrink and engage the cable jacket 8 and in so doing provide a pressure resistent bond which is aided by the bonding material 9. Thus the plastic cap 6 is sealed to the cable jacket 8 and has communication only with the cable core 4, and the further application of heat from the upper to the lower portion of the plastic cap 6 causes a shrinkage of the chamber within the cap 6 resulting in the casting resin 7 being uniformly forced into the cable core 4. As illustrated in FIGS. 2 and 3, the plastic cap 6 assumes a maximum cross-sectional configuration which is only slightly larger than that of the cable jacket 8, and decreases substantially to approximate the configuration of the tension eye 5 which it encompasses. As will be readily apparent from the above described sequential steps of heating and resulting shrinkages of the plastic cap 6, a large amount of the casting resin 7 is uniformly forced into the cable core 4 to obtain a secure mounting of the serrated pointed end 3 of the tension rod 2 within the cable core.

Figure 4:
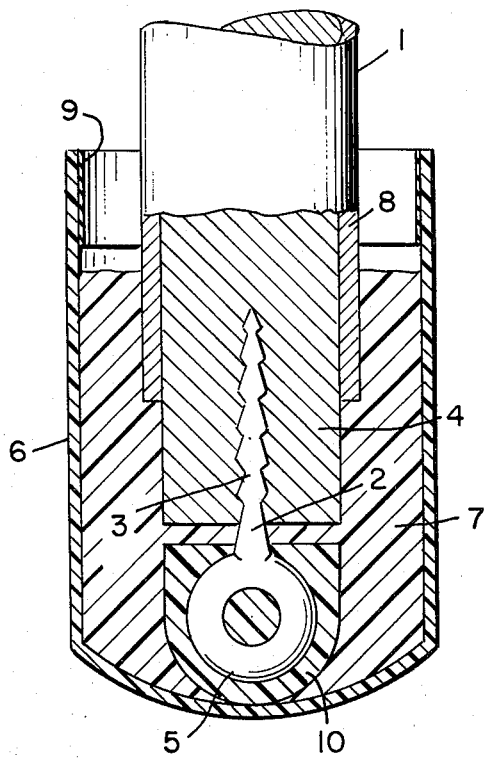
FIG. 4 is a simplified cross-sectional, side elevation view of a tension rod cable assemblage of a second embodiment of the instant invention showing a plastic cap in position prior to shrinking.
Figure 5:
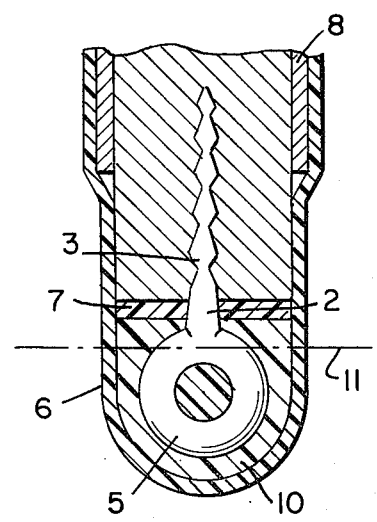
FIG. 5 is a simplified cross-sectional, side elevation view of a tension rod cable assemblage of FIG. 4 but after the plastic cap has been shrunk by the application of heat thereto.

Pursuant to the instant invention, the tension eye may be provided with a covering material so that it is automatically maintained free of the casting resin so as to provide ready access to the eye for engagement thereto by, for example spring safety hooks to which a pulling rope may be attached for pulling the cable through a cable conduit. FIGS. 4 and 5 depict a second embodiment of the instant invention having features that correspond to those depicted of the prior embodiment by FIGS. 1, 2, and 3 except for the provision of a covering material 10 which may comprise two half shells of styropor. Such shells 10 are mounted on the tension eye 5 prior to moving the plastic cap 6 in position and the subsequent heating steps. After the plastic cap 6 is moved into position and sequentially heated in a manner similar to that described with respect to the embodiment depicted in FIGS. 1 – 3, the plastic cap 6 having been shrunk to the configuration depicted in FIG. 5 may be cut at, for example, line 11 for the removal of the covering material 10 for ready accessibility to the tension eye 5.

Though the invention has been described in conjunction with exemplary embodiments thereof, it will be understood that many modifications will be readily apparent to those who are ordinarily skilled in the art; and that this application is intended to cover any adaptations or variations thereof. Therefore it is manifestly intended that this invention be limited only by the claims and the equivalence thereof.

I claim:

1. Method of attaching a tension rod to an end of a cable, comprising the steps of:
   inserting one end of a tension rod axially into the core of the cable;
   vertically positioning the combination so formed with the other end of the tension rod extending downward;
   moving a heat shrinkable plastic cap having one open end up from below the tension rod until the upper-side surfaces of the cap encompass a portion of the cable jacket, the plastic cap containing a reservoir of casting resin;
   heating the upper portion of the plastic cap so as to shrink the upper side portions thereof into engagement with the cable jacket to bond the plastic cap to the cable jacket; and
   further heating the lower portion of the plastic cap so as to shrink the chamber volume within the plastic cap for pressing the casting resin into the cable core.

2. The method according to claim 1 additionally comprising the step of applying a pressure resistant bonding material to the upper-inside surfaces of the plastic cap.

3. The method in accordance with claim 1 comprising the further step, prior to moving the plastic cap into position, of placing a covering material over a portion of the tension rod extending from the cable core to prevent the penetration of casting resin into portions of the tension rod.

4. The method in accordance with claim 3, further comprising the step of cutting away a lower portion of the plastic cap upon the completion of the heating steps for removing the covering material and providing accessibility to the tension rod.

5. A tension rod cable assemblage comprising:
   a cable including a cable jacket and cable core;
   a tension bar having one end axially inserted into the cable core;
   a plastic cap comprised of heat shrinkable material and having side portions that engage said cable jacket to form a high resistant pressure bond therebetween; and
   a casting resin within the cable core which secures the inserted end of said tension rod to the cable core,
   said assemblage being formed in accordance with the method of claim 1.

6. The tension rod cable assemblage in accordance with claim 5 wherein said side portions of said plastic cap include a strip of pressure resistant bonding material.

7. The tension rod cable assemblage in accordance with claim 5 wherein said tension rod includes a tension eye at the end thereof opposite the cable core.

8. The tension rod cable assemblage in accordance with claim 7 wherein a covering material is attached to said tension eye for preventing the penetration of casting resin into said tension eye.

* * * * *